United States Patent
Wakitani et al.

(10) Patent No.: US 7,073,613 B2
(45) Date of Patent: Jul. 11, 2006

(54) MOTORIZED VEHICLE

(75) Inventors: Tsutomu Wakitani, Wako (JP); Tsutomu Inui, Wako (JP); Kenji Kuroiwa, Wako (JP); Jitsumi Hanafusa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 179 days.

(21) Appl. No.: 10/879,936

(22) Filed: Jun. 28, 2004

(65) Prior Publication Data

US 2004/0238239 A1 Dec. 2, 2004

Related U.S. Application Data

(62) Division of application No. 10/021,394, filed on Oct. 29, 2001, now Pat. No. 6,805,218.

(30) Foreign Application Priority Data

| Oct. 30, 2000 | (JP) | 2000-331554 |
| Oct. 30, 2000 | (JP) | 2000-331561 |
| May 1, 2001 | (JP) | 2001-134689 |

(51) Int. Cl.
*B60K 17/30* (2006.01)

(52) U.S. Cl. .................. 180/6.5; 180/19.3; 180/315; 280/98

(58) Field of Classification Search ................. 180/6.2, 180/6.48, 6.5, 6.66, 6.7, 19.1, 19.3, 315, 180/322; 280/98, 103
See application file for complete search history.

(56) References Cited

U.S. PATENT DOCUMENTS

| 2,605,852 | A | * | 8/1952 | Rhoads ...................... 180/6.7 |
| 6,378,883 | B1 | * | 4/2002 | Epstein .................... 280/250.1 |
| 6,550,563 | B1 | * | 4/2003 | Velke et al. ................ 180/333 |

* cited by examiner

*Primary Examiner*—Eric Culbreth
(74) *Attorney, Agent, or Firm*—Adams & Wilks

(57) ABSTRACT

A motorized vehicle has a vehicle body, at least a pair of wheels mounted on the vehicle body for undergoing rotation to cause the motorized vehicle to undergo travelling, and a pair of electric motors each mounted on the vehicle body to selectively undergo forward and reverse rotation to rotationally drive a respective one of the wheels. A first switch is connected to the electric motors so that operation of the first switch causes the electric motors to undergo rotation simultaneously in opposite directions to turn the motorized vehicle in a first direction while the motorized vehicle does not undergo travelling. A second switch is connected to the electric motors so that operation of the second switch causes the electric motors to undergo rotation simultaneously in opposite directions to turn the motorized vehicle in a second direction opposite to the first direction while the motorized vehicle does not undergo travelling.

7 Claims, 16 Drawing Sheets

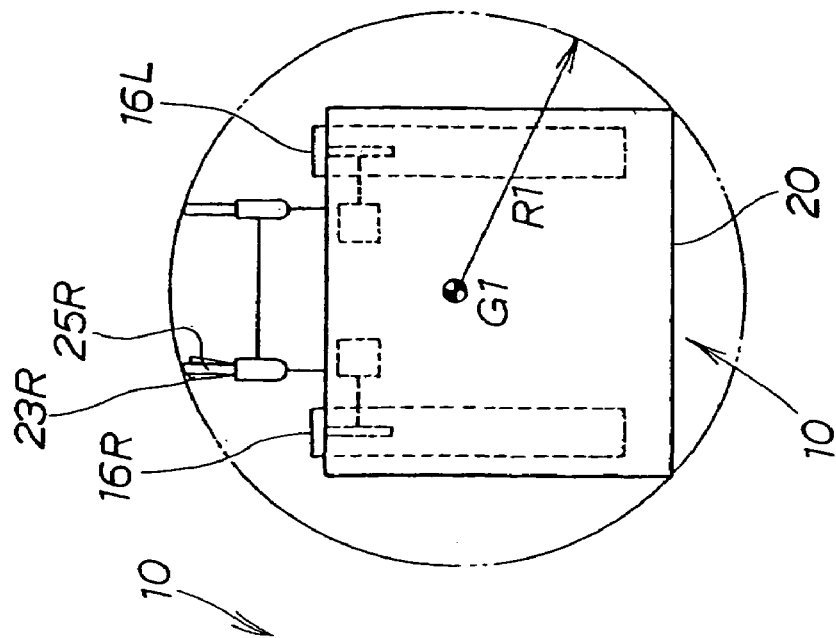
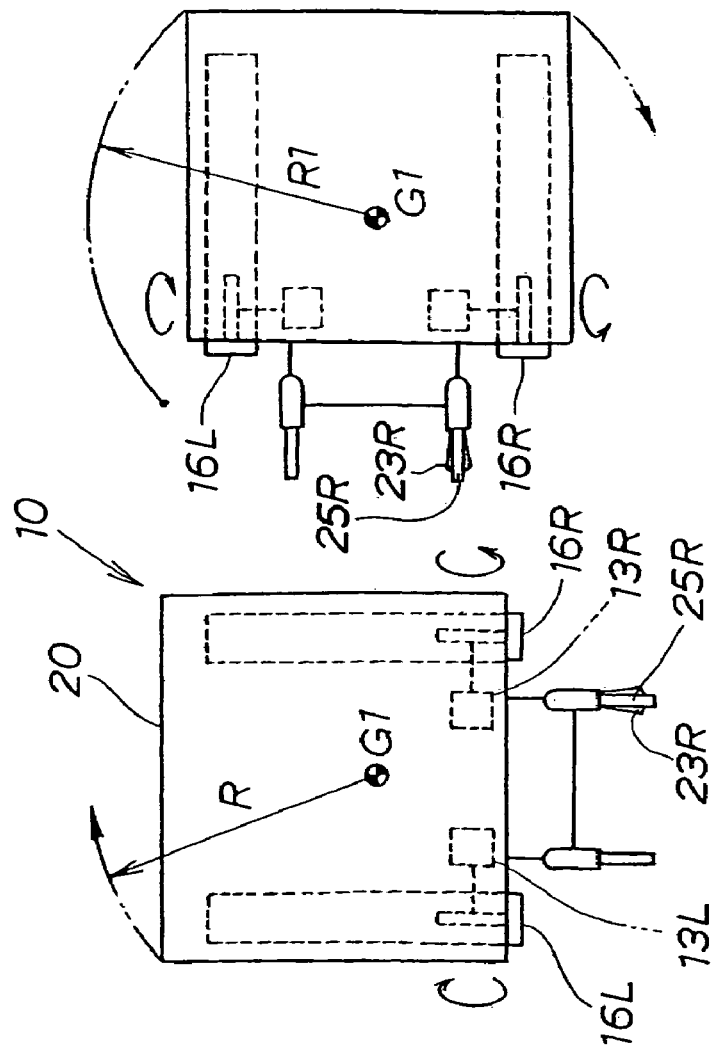
FIG. 7A  FIG. 7B  FIG. 7C

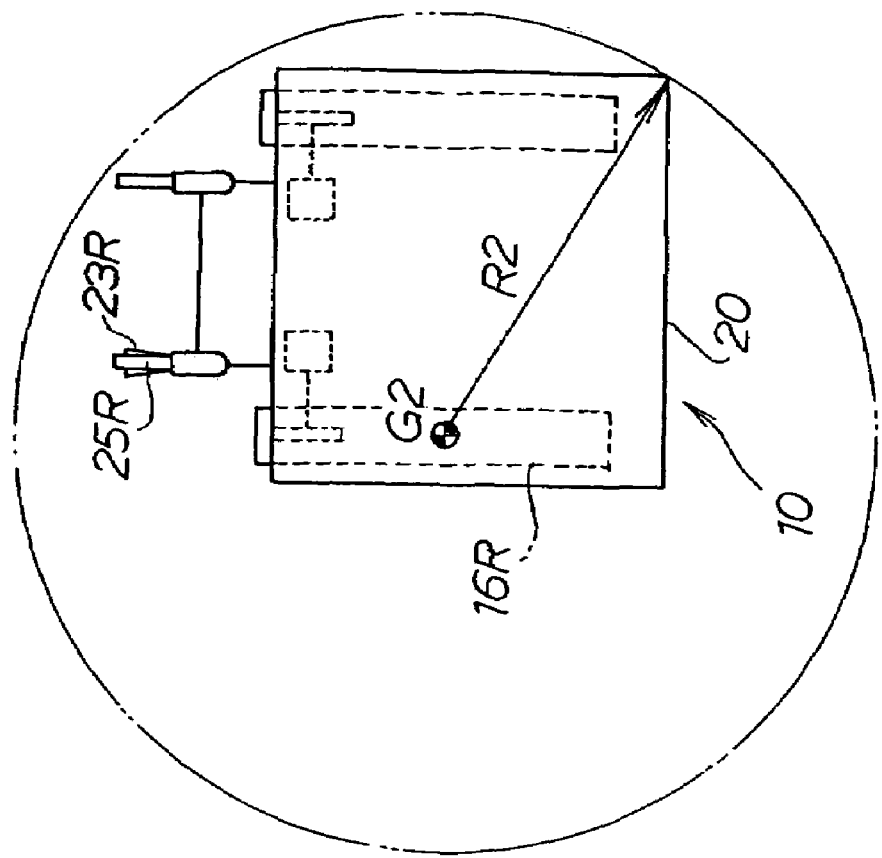
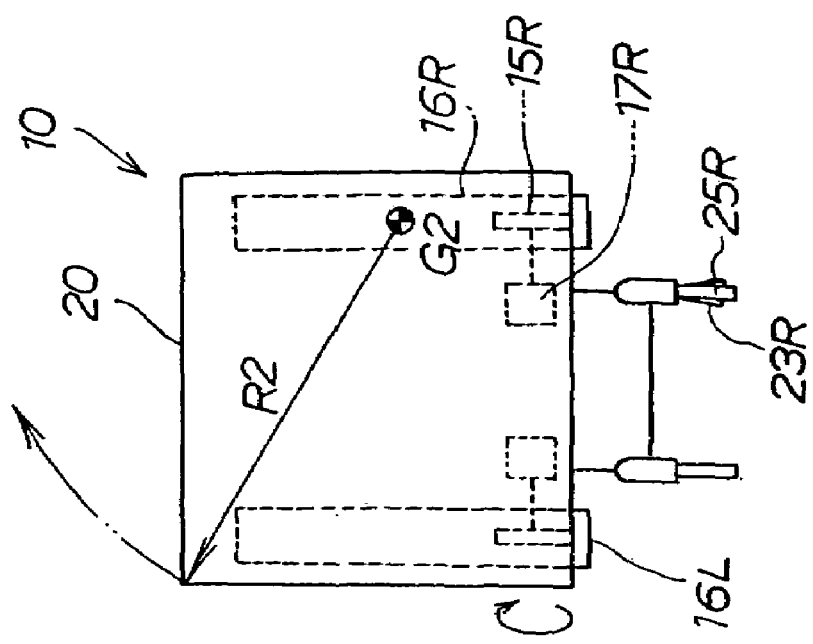

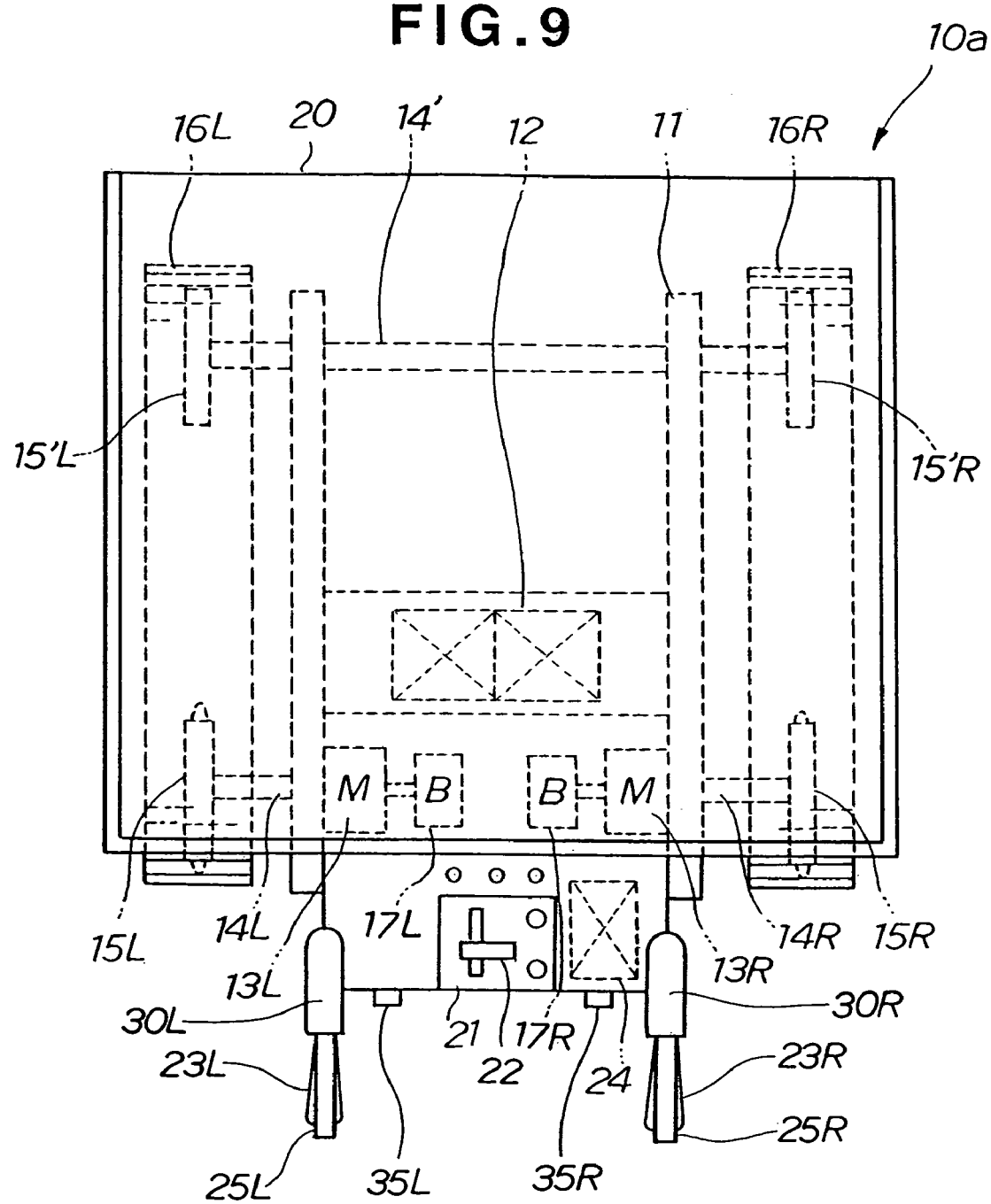

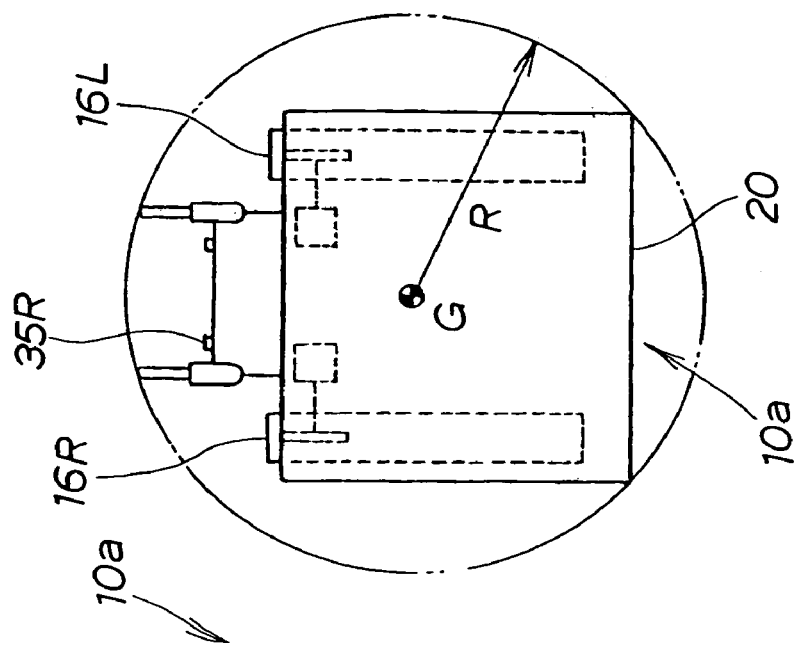
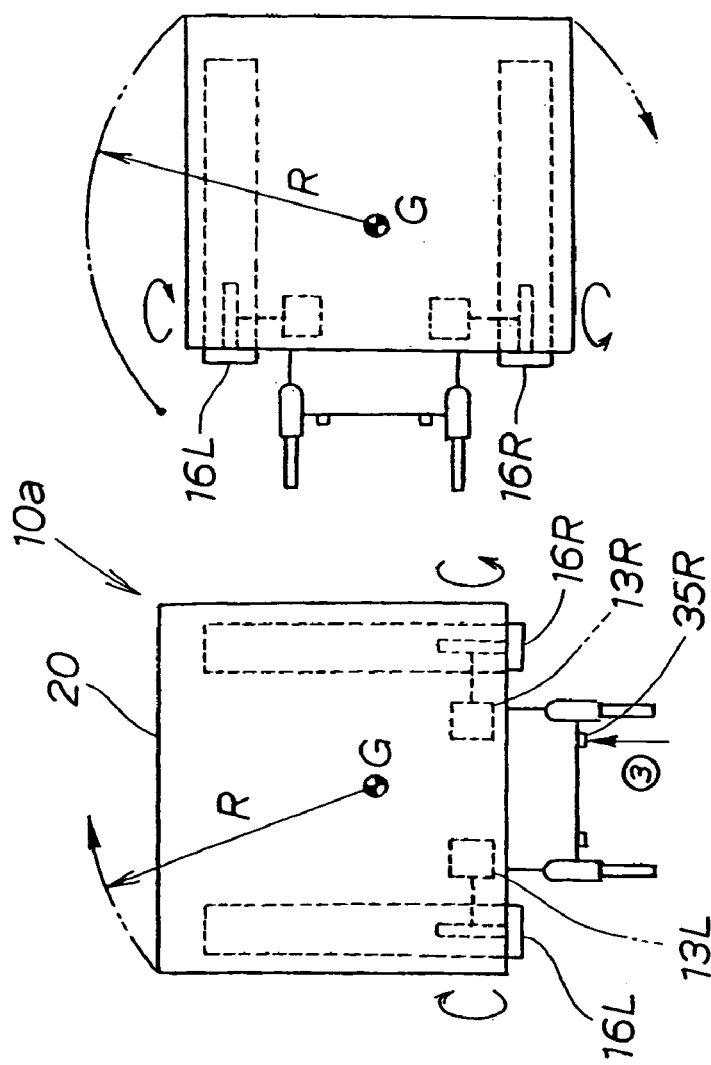
FIG.13C
FIG.13B
FIG.13A

MOTORIZED VEHICLE

CROSS-REFERENCE TO RELATED APPLICATIONS

This application is a divisional application of U.S. patent application Ser. No. 10/021,394 filed Oct. 29, 2001 and claiming a priority date of Oct. 30, 2000, now U.S. Pat. No. 6,805,218.

BACKGROUND OF THE INVENTION

1. Field of the Invention

The present invention relates to a motorized vehicle having left and right driving wheels independently driven by left and right electric motors, respectively.

2. Background Information

The term "working machine" is used herein in a comprehensive sense, i.e., to broadly refer to a load-carrying vehicle, a tiller, a tractor, a lawn mower, a snowplow and so on. In case of the tiller, uncultivated areas are formed at ends of an arable land where the tiller makes a 180° turn. The uncultivated areas should preferably be as small as possible. To meet this condition, the tiller is designed to have a smaller turning radius and, ideally, the tiller can make a turn while staying at the same position. Such a turn is referred to as "spot turn". The spot turn is very useful not only for the tiller but also for other sorts of working machines because they are required to make sharp or abrupt turns frequently to avoid interference with obstacles.

Conventional techniques proposed to improve turning performance characteristics of working vehicles are disclosed in Japanese Patent Laid-open Publications Nos. 10-95360 and 6-87340.

The working vehicle disclosed in Japanese Patent Laid-open Publications Nos. 10-95360 includes a travel HST continuously variable shift mechanism and a turning HST continuously variable shift mechanism disposed in juxtaposition. The travel HST continuously variable shift mechanism is operated by a speed change lever while the turning HST continuously variable shift mechanism is operated a round-type steering handle. The disclosed working vehicle is complicated in construction because a number of links are disposed in a complicated manner below the steering handle and speed change lever. Furthermore, the side-by-side arrangement of two shift mechanisms increases the number of components of the working vehicle and makes the working vehicle expensive to manufacture.

The working machine disclosed in Japanese Patent Laid-open Publications No. 6-87340 includes a hydraulic continuous variable transmission mechanism equipped with left and right neutral valves adapted to be operated by left and right side clutch control levers provided on left and right handlebars, respectively, of the working vehicle. When the left side clutch control lever is gripped together with the left handlebar, the left neutral valve is activated to realize a clutch-off state of the continuous variable transmission mechanism. Similarly, when the right side clutch control lever is gripped together with the right handlebar, the right neutral valve is activated to realize the clutch-off state of the continuous variable transmission mechanism. With this construction, when a spot turn is to be made, the operator is required to manipulate left and right side clutch control levers with high dexterity. A similar attempt by a non-skilled operator would result in a turn of the working vehicle achieved with an increased turning radius much larger than that attained by the spot turn.

SUMMARY OF THE INVENTION

It is accordingly an object of the present invention to provide a motorized vehicle which is simple in construction but can achieve a spot turn easily and reliably.

To achieve the foregoing object, according to the present invention, there is provided a motorized vehicle comprising: a vehicle body; a left driving wheel and a right driving wheel that are rotatably mounted on the vehicle body; a left electric motor and a right electric motor that are mounted on the vehicle body for independently rotating the left and right driving wheels, respectively, at variable speeds; and an actuator for causing one of the left and right electric motors to rotate in one direction and, at the same time, causing the other of the left and right electric motors to rotate in the opposite direction, thereby ensuring that the vehicle making a turn while staying at the same position.

In one preferred form, the motorized vehicle further includes a pair of left and right handlebars extending from the vehicle body in a rearward direction of the motorized vehicle, each of the handlebars having a handgrip adapted to be gripped by the operator. The actuator comprises a left brake and a right brake that are mounted on the vehicle body for independently applying brake forces to the left and right driving wheels, respectively, and a pair of left and right turn control levers pivotally mounted to the left and right handlebars, respectively, so as to extend along the corresponding handgrips. The left and right turn control levers are operatively connected to both the left and right brakes and the left and right electric motors, respectively, such that the left and right electric motors are caused to rotate simultaneously in opposite directions based on the angular positions of the left and right turn control levers. The left and right brakes are associated with the left and right electric motors, respectively, and separately apply the brake forces to the left and right driving wheels via the left and right electric motors.

It is preferable that the left and right turn control levers are angularly movable between an initial zero-brake position and a stroke end position opposite to the zero-brake position across a full-brake position. The left and right turn control levers are operatively linked with the left and right brakes and the left and right electric motors such that when the left turn control lever moves within a first range defined between the zero-brake position and the full-brake position, the brake force applied from the left brake varies linearly with the amount of displacement of the left turn control lever, when the left turn control lever moves within a second range defined between the full-brake position and the stroke end position, the left electric motor is rotated in the reverse direction, and the right electric motor is rotated in the forward direction, when the right turn control lever moves within the first range, the brake force applied from the right brake varies linearly with the amount of displacement of the right turn control lever, and when the right turn control lever moves within the second range, the right electric motor is rotated in the reverse direction, and the left electric motor is rotated in the forward direction.

In another preferred form, the actuator comprises a left spot turn switch operatively connected to the left and right electric motors and manually operable to cause the left electric motor to rotate in the reverse direction and the right electric motor to rotate in the forward direction, and a right spot turn switch operatively connected to the left and right electric motors and manually operable to cause the right electric motor to rotate in the reverse direction and the left electric motor to rotate in the forward direction. The motorized vehicle may further include an operator control panel mounted to the vehicle body in which instance, the left and right spot turn switches are provided on the operator control panel.

The motorized vehicle may further include a pair of left and right crawler belts driven by the left and right driving wheels.

BRIEF DESCRIPTION OF THE DRAWINGS

Certain preferred embodiments of the present invention will hereinafter be described in detail, by way of example only, with reference to the accompanying drawings, in which:

FIGS. 7A to 7C are diagrammatical views illustrative of the manner in which the vehicle makes a sport turn;

FIGS. 8A and 8B are diagrammatical views illustrative of the manner in which the vehicle makes a normal pivot turn;

FIG. 9 is a plan view of a motorized vehicle according to a second embodiment of the present invention;

FIGS. 13A to 13C are diagrammatical views illustrative of the manner in which the vehicle shown in FIG. 9 makes a sport turn;

DETAILED DESCRIPTION OF THE PREFERRED EMBODIMENTS

Figure 1:
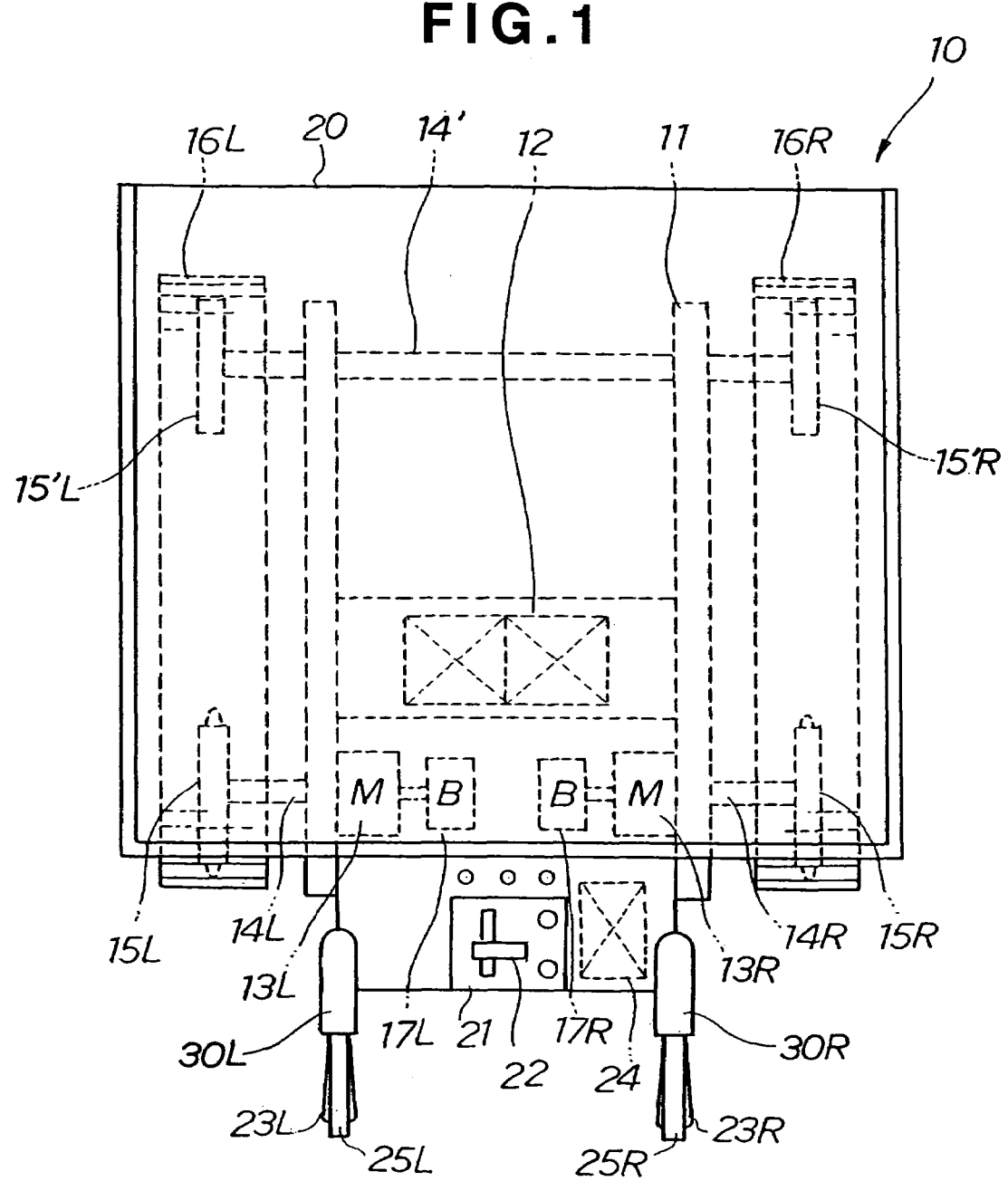
FIG. 1 is a plan view of a motorized vehicle according to a first embodiment of the present invention.

FIG. 1 shows in plan view a motorized vehicle 10 according to a first embodiment of the present invention, the vehicle 10 taking the form of a walk-behind motorized crawler cart. The motorized crawler cart 10 generally comprises a vehicle frame or body 11, batteries 12 mounted on the vehicle body 11, left and right electric motors 13L, 13R powered with the batteries 12, left and right driving axles 14L, 14R rotatably mounted on the vehicle frame 11 and independently driven by the left and right electric motors 13L, 13R, respectively, left and right driving wheels 15L, 15R attached to an end of the left and right driving axles 14L, 14R, respectively, left and right crawler belts 16L, 16R each stretched between the driving wheel 15L, 15R and a driven wheel 15'L, 15'R and driven by the driving wheel 15L, 15R, and left and right brakes 17L, 17R for independently applying a braking force to the left and right driving wheels 15L, 15R, respectively. In the illustrated embodiment, the left and right brakes 17L, 17R are associated with the left and right electric motors 13L, 13R, respectively, for independently braking the motors 13L, 13R to vary the speeds of the left and right driving wheels 15L, 15R. The driven wheels 15'L, 15'R are rotatably mounted on opposite ends of a front axle 14' rotatably mounted on the vehicle body 11.

The vehicle 10 further has a load-carrying platform 20 mounted on the vehicle body 11, an operator control panel 21 mounted to a rear end of the load-carrying platform 20, and left and right operation handlebars 30L, 30R extending from a rear portion of the operator control panel 21 obliquely upward in a rearward direction of the motorized crawler cart 10. The handlebars 30L, 30R may be so arranged to extend from the vehicle body 11 or the platform 20. The operator control panel 21 is provided with an accelerator lever 22.

The operation handlebars 30L, 30R have handgrips 25L, 25R at free ends thereof for being gripped with hands of the operator. Left and right turn control levers 23L, 23R attached to the left and left handlebars 30L, 30R so as to extend along the left and right handgrips 25L, 25R, respectively. The turn control levers 23L, 23R are manually operated to control operation of the corresponding electric motors 13L, 13R and the brakes 17L, 17R in a manner as described below.

The operator manipulates levers and buttons including the accelerator lever 22 on the operator control panel 21 and the turn control levers 23L, 23R while walking behind the vehicle 10 so as to move the vehicle forward or backward, turn the vehicle leftward or rightward, and stop the vehicle.

A control unit 24 is disposed inside the operator control panel 21 and controls operation of the electric motors 13L, 13R and the left and right brakes 17L, 17R based on the positions of the accelerator lever 22 and turn control levers 23L, 23R. The brakes 17L, 17R may be an electromagnetic brake, a hydraulic brake, a mechanical brake, regenerative brake and so on.

Figure 2A:
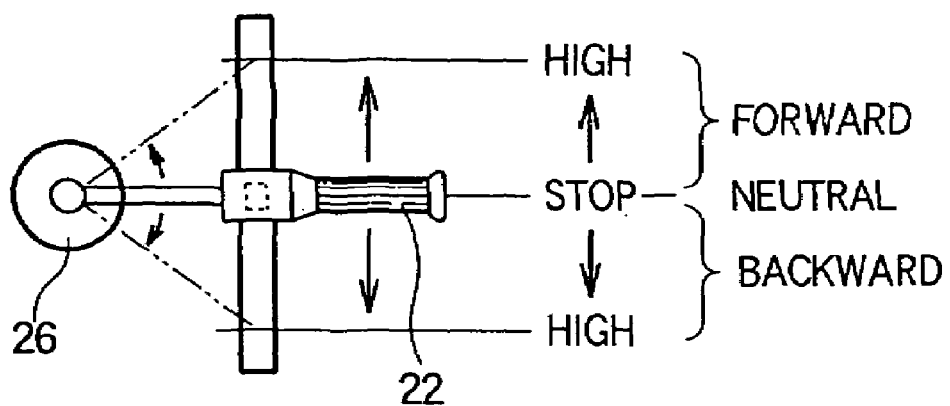
FIG. 2A is a diagrammatical view showing the operation of an accelerator lever of the motorized vehicle.
Figure 2B:
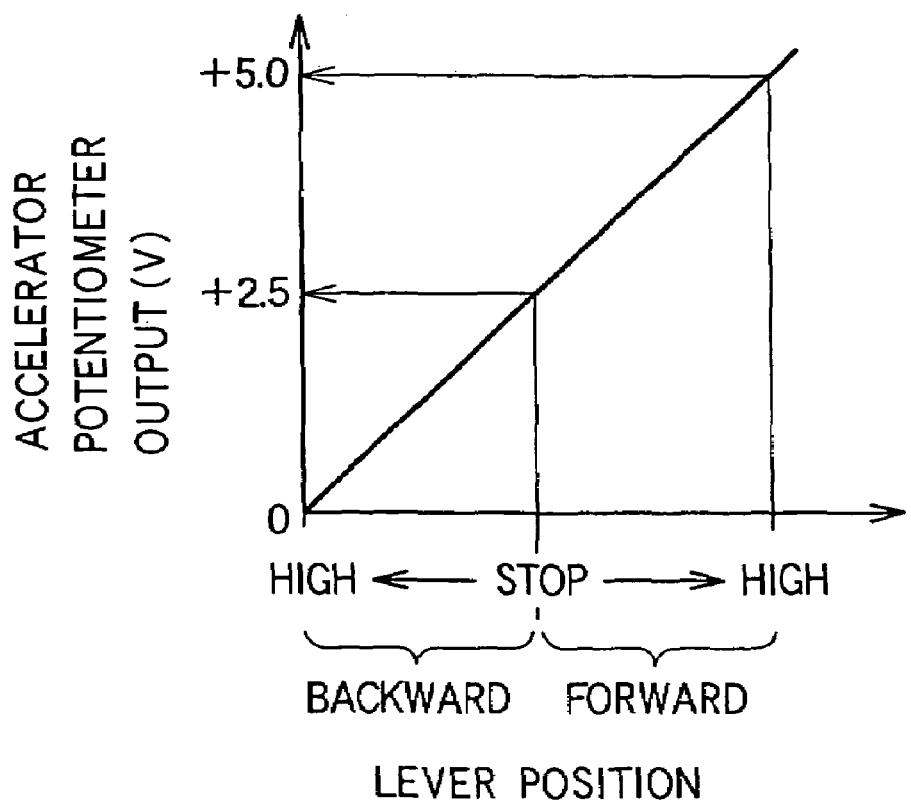
FIG. 2B is a graph showing the relationship between the output from an accelerator potentiometer and the position of the accelerator lever.

The accelerator lever 22 is manually actuated to control the direction and speed of movement of the vehicle 10. The accelerator lever 22 is normally disposed in a neutral position where the vehicle is stopped. The position of the acceleration lever 22 is monitored by an accelerator potentiometer 26 shown in FIG. 2A. The output from the accelerator potentiometer 26 varies linearly with the amount of angular displacement of the accelerator lever 22, as indicated by a graph shown in FIG. 2B. In the illustrated embodiment, the output from the accelerator potentiometer 26 is set to vary within a range from 0 to 5.0 volts (V). A maximum forward speed of the vehicle is achieved when the output from the accelerator potentiometer 26 is +5.0 V. A maximum backward vehicle speed is achieved when the accelerator potentiometer output is 0 volt. The vehicle is stopped when the accelerator potentiometer output is 2.5 V.

Figure 3:
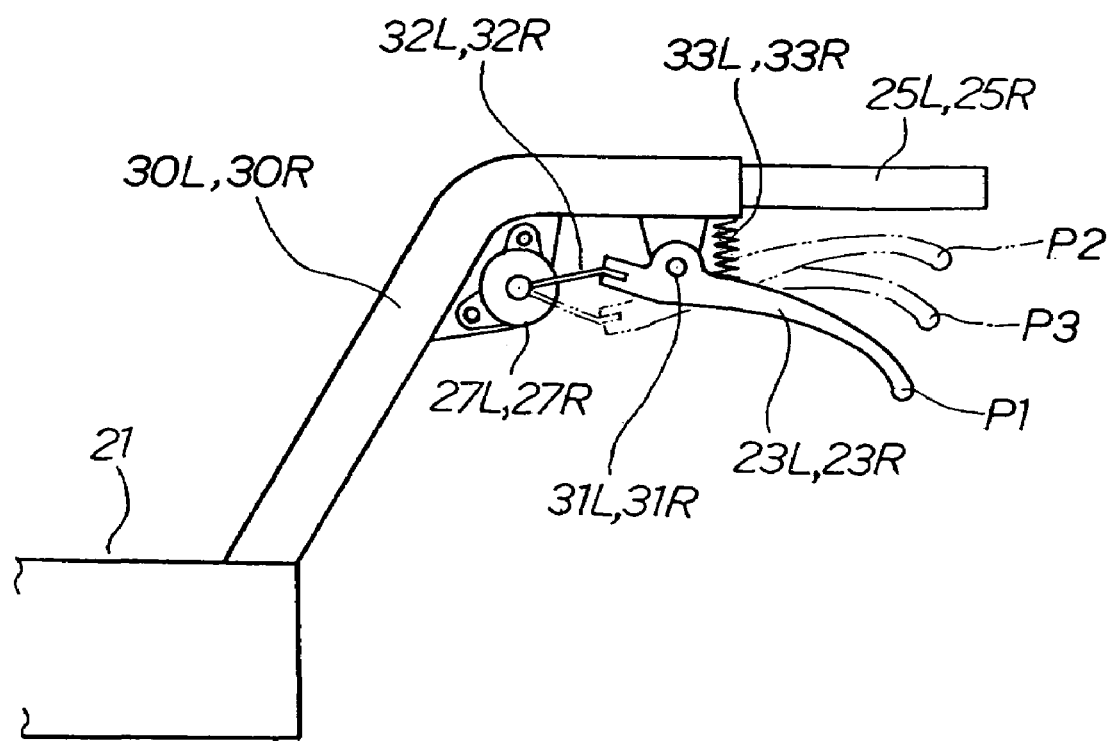
FIG. 3 is a side view showing a brake control lever serving also as a turn control lever of the motorized vehicle.

FIG. 3 shows a free end portion of the operation handlebar 30L, 30R including the handgrip 25L, 25R. The turn control lever 23L, 23R is pivotally connected by a hinge pin 31L, 31R to the handlebar 30L, 30R so as to extend along the handgrip 25L, 25R. The turn control lever 23L, 23R is firmly connected to one end of an actuator arm 32L, 32R of a brake potentiometer 27a, 27b so that the actuator 32L, 32R angularly moves or turns in unison with the turn control lever 25L, 25R. The brake potentiometer 27L, 27R is designed such that the output from the brake potentiometer 27a, 27b varies linearly with the amount of angular displacement of the actuator arm 32L, 32R and turn control lever 23L, 23R. As shown in FIG. 3, the turn control lever 23L, 23R is angularly movable between an initial zero-brake position (first position) P1 indicated by the solid line and a stroke end position (second position) P2 indicated by two-dot chain line through a full-brake position (third position) P3 indicated by the dashed line. The turn control lever 23L, 23R is normally disposed in the solid-lined zero-brake position P1 by the force of a return spring 33L, 33R.

Figure 4A:
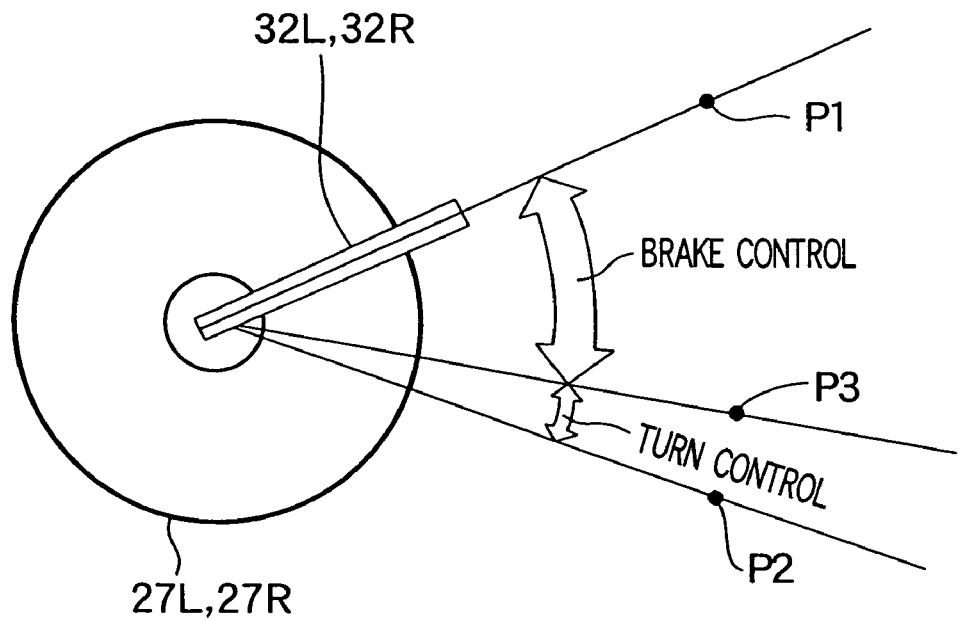
FIG. 4A is a diagrammatical view showing the operation of a brake potentiometer taken in conjunction with the position of the turn control lever.
Figure 4B:
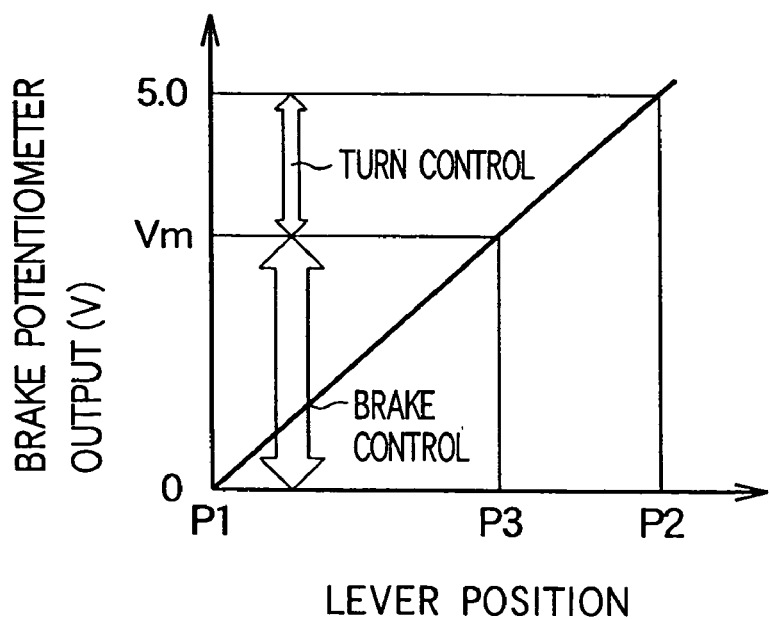
FIG. 4B is a graph showing the relationship between the output from the brake potentiometer and position of the turn control lever.

FIG. 4A shows a range of angular movement of the actuator arm 32L, 32R of the brake potentiometer 27L, 27R, which corresponds to the range of movement of the turn control lever 23L, 23R shown in FIG. 3. As shown in FIG. 4, the actuator arm 32L, 32R is angularly movable between the first position (zero-brake position) P1 and the second position (stroke end position) P2 through the third position (full-brake position) P3. The output from the brake potentiometer 27L, 27R varies linearly with the position of the actuator arm 32L, 32R and turn control lever 23L, 23R, as indicated by a graph shown in FIG. 4B. In the illustrated embodiment, the output from the brake potentiometer 27L, 27R is set to vary within a range from 0 to 5.0 volts (V). When the turn control lever 23L, 23R is in the initial zero-brake position P1, the output from the brake potentiometer is nil. When the turn control lever 23L, 23R is in the stoke end position P3, the output from the brake potentiometer is 5.0 V. And when the turn control lever 23L, 23R is in the intermediate full-brake position P2, the output from the brake potentiometer is Vm volts, where Vm is greater than 0 and smaller than 5.0. The output voltage Vm may be 1.5, 2.0 or 2.5 volts.

As shown in FIGS. 4A and 4B, when the turn control lever 23L, 23R (i.e., the actuator arm 32L, 32R) moves within a range defined between the zero-brake position P1 and the full-brake position P3, brake control operation is achieved. On the other hand, when the turn control lever 23L, 23R (actuator arm 32L, 32R) moves within a range defined between the full-brake position P3 and the stroke end position P2, turn control operation is achieved.

Figure 5:
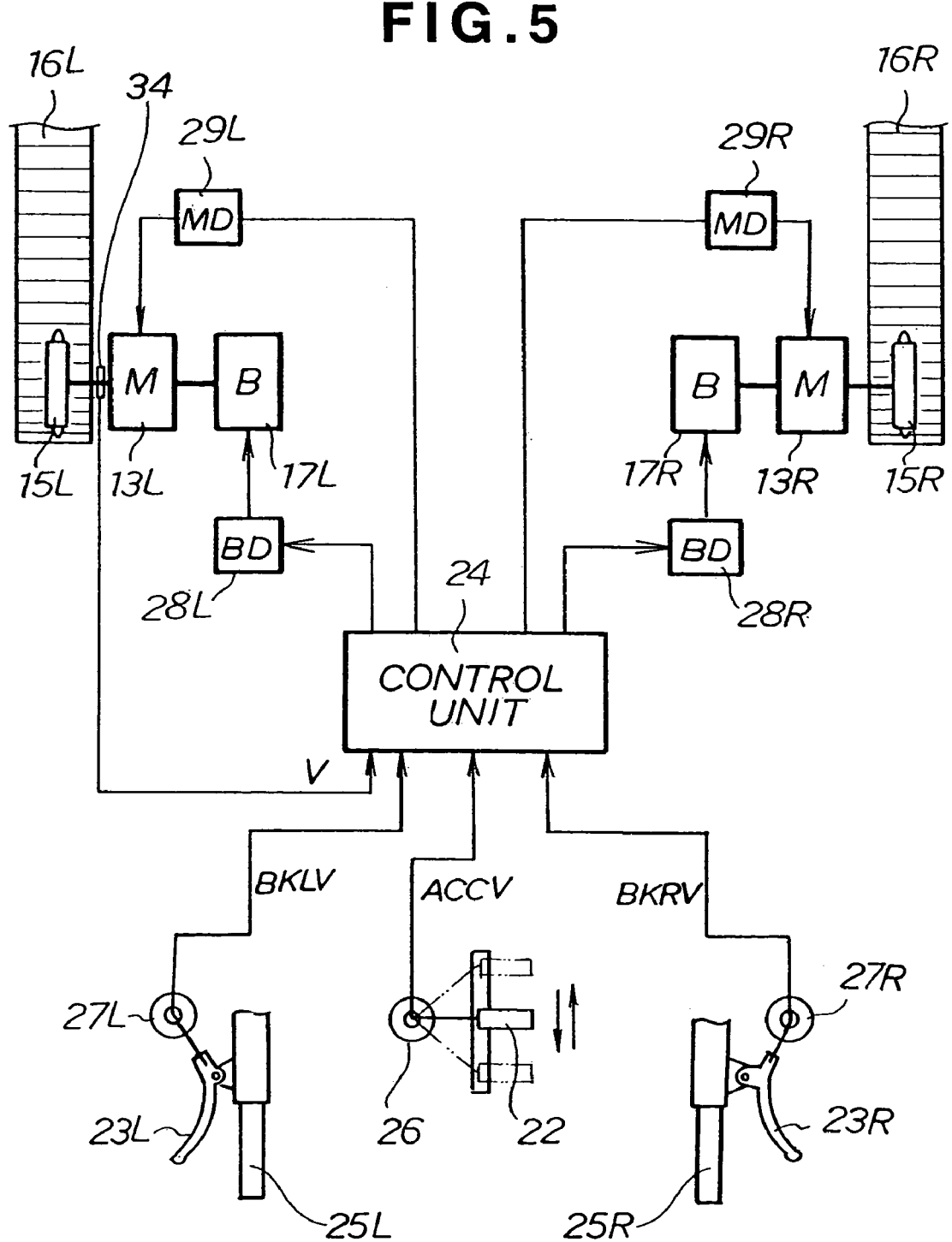
FIG. 5 is a pictorial block diagram showing a control system of the motorized vehicle.

FIG. 5 shows a control system of the motorized vehicle 10. As shown in this figure, the accelerator potentiometer 26 and the left and right brake potentiometers 27L, 27R are electrically connected to the control unit 24. Also connected to the control unit 24 is a vehicle speed sensor 34 for detecting the speed of the vehicle 10. The control unit 24 is electrically connected to the left and right brakes 17L, 17R via left and right brake drivers 28L, 28R, respectively, for controlling operation of the brakes 17L, 17R based on the position of the corresponding turn control levers 23L, 23R in a manner described below. Similarly, the control unit 24 is electrically connected to the left and right electric motors 13L, 13R via left and right motor drivers 29L, 29R, respectively, for controlling operation of the motors 13L, 13R based on the position of the accelerator lever 22 in a manner described below. In a practical sense, the brake drivers 28L, 28R and the motor drivers 29L, 29R are formed as a part of the control unit 24.

When the left turn control lever 23L is manipulated or otherwise pulled by the operator, the left brake potentiometer 27L generates an output signal BKLV corresponding in magnitude to the amount of angular displacement of the turn control lever 23L. Upon receipt of the output signal BKLV from the brake potentiometer 27L, the controller 24 sends a command signal to the left brake driver 28L so that the left brake 17L is driven to apply to the left driving wheel 15L a brake force corresponding to the position of the left turn control lever 23L. When the left turn control lever 23L (i.e., the actuator arm 32L of the left brake potentiometer 27L) is in the brake control range defined between the zero-brake position P1 and the full-brake position P3 (FIGS. 4A and 4B), brake control operation is achieved, in which the brake force applied from the left brake 17L to the left driving wheel 15L varies linearly with the amount of angular displacement of the left turn control lever 23L.

Similarly, when the right turn control lever 23R is manipulated or otherwise pulled by the operator, the right brake potentiometer 27R generates an output signal BKRV corresponding in magnitude to the amount of angular displacement of the turn control lever 23R. Upon receipt of the output signal BKRV from the brake potentiometer 27R, the controller 24 sends a command signal to the right brake driver 28R so that the right brake 17L is driven to apply to the right driving wheel 15R a brake force corresponding to the position of the right turn control lever 23R. When the right turn control lever 23R (i.e., the actuator arm 32R of the right brake potentiometer 27R) is in the brake control range defined between the zero-brake position P1 and the full-brake position P3 (FIGS. 4A and 4B), brake control operation is achieved, in which the brake force applied from the right brake 17R to the right driving wheel 15R varies linearly with the amount of angular displacement of the right turn control lever 23R.

When the accelerator lever 22 is actuated or otherwise tilted by the operator, the accelerator potentiometer 26 generates an output signal ACCV corresponding in magnitude to the amount of angular displacement of the accelerator lever 22. Upon receipt of the output signal ACCV from the accelerator potentiometer 26, the controller 24 sends a command signal to the left and right motor drivers 29L, 29R so that the left and right electric motors 13L, 13R rotate the corresponding driving wheels 15L, 15R in the forward or backward direction at a speed corresponding to the position of the accelerator lever 22. Thus, the vehicle (crawler cart) with crawler belts 16L, 16R independently driven by the driving wheels 15L, 15R moves in the forward or backward direction at the desired speed.

Figure 6:
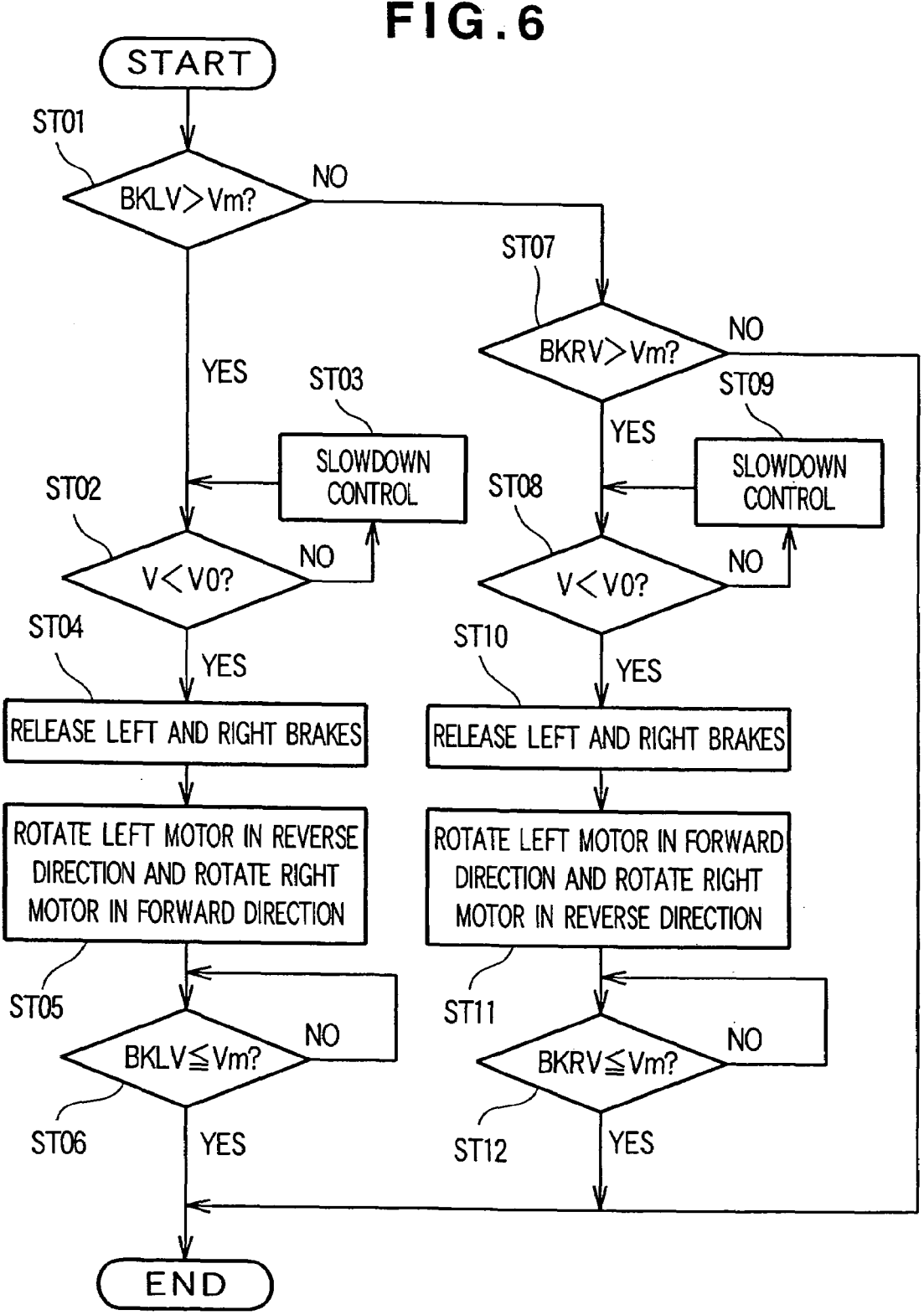
FIG. 6 is a flowchart showing a series of operations achieved by the control system when the vehicle makes a spot turn.

When the left or right turn control lever 23L, 23R is pulled to approach the handgrip 25L, 25R across the full-brake position P2 (FIGS. 4A and 4B), turn control operation is achieved under the control of the control unit 24 so as to ensure that the vehicle makes a turn while staying at the same position (spot turn). The turn control operation will be described with reference to a flowchart shown in FIG. 6.

At a first step ST01, a judgment is made to determine as to whether or not the output signal BKLV from the left brake potentiometer 27L (FIG. 5) is greater than Vm (FIG. 4B). When the result of judgment is "YES" (BKLV>Vm), this means that the left turn control lever 23L is disposed in the turn control range defined between the full-brake position P3 and the stroke end position P2 (FIGS. 3 and 4A). The control then goes on to a step ST02. Alternately, when the result of judgment is "NO" (BKLV,≦Vm), the control moves to a step ST07.

At the step ST02, the output signal V from the vehicle speed sensor 34 (FIG. 5) is monitored so as to determine whether or not the vehicle speed V is not more than V0 where V0 represents the vehicle being at halt or moving at a slow speed which allows the vehicle to make an abrupt turn. When the result of judgment is "YES" (V<V0), the control advances to a step ST04. Alternately when the judgment result is "NO" (V≧V0), the control moves to a step ST03.

At the step ST03, slowdown control is achieved in which the control unit 24 (FIG. 5) controls the electric motors 13L, 13R via the motor drivers 29L, 29R so as to slow down the rotational speed of the driving wheels 15L, 15R. This operation continues until the vehicle speed V is below V0.

At the step ST04, the left and right brakes 17L, 17R (FIG. 5) are released or de-activated to allow rotation of the left and right driving wheels 15L, 15R. After the step ST04, the control goes on to a step ST05.

The step ST05 is achieved on condition that VKLV>Vm and V<V0 (that is, the left turn control lever 23L is in the turn control range defined between the full-brake position P3 and the stroke end position P2, and the vehicle is stopped or moving at a slow speed which allow the vehicle to make an abrupt turn). At the step ST05, the left electric motor 13L (FIG. 5) is rotated in the reverse direction and, at the same time, the right electric motor 13R is rotated in the forward direction. The term "forward direction" is used to refer to a direction to move the vehicle forward, and the term "reverse direction" is used to refer to a direction to move the vehicle backward. By thus driving the left and right electric motors 13L, 13R simultaneously in opposite directions, the vehicle starts to make an abrupt turn in the leftward direction while staying at the same position (spot turn).

When the vehicle has turned leftward through a desired angle (180 degrees, for example), the operator releases the left turn control lever 23L, allowing the lever 23L to return to its initial zero-brake position P1 (FIGS. 3 and 4B). This causes the output BKLV from the left brake potentiometer 27L to go down to or below Vm (BKLV≦Vm). This condition is detected at a step ST06 whereupon the control comes to an end and operation of the vehicle returns to a regular operation mode.

At the step ST07, which follows the "NO" state at the preceding step ST01, a judgment is made to determine as to whether or not the output signal BKRV from the right brake potentiometer 27R (FIG. 5) is greater than Vm (FIG. 4B). When the result of judgment is "YES" (BKRV>Vm), the control advances to a step ST08. Alternately, when the judgment result is "NO"(BKRV≦Vm), this means that either lever 23L, 23R (actuator arm 32L, 32R of the brake potentiometer 27L, 27R) is not in the turn control range defined between the full-brake position P3 and the stroke end position P2. Accordingly, the control is terminated.

At the step ST08, following the "YES" state in the preceding step ST07, the output signal V from the vehicle speed sensor 34 (FIG. 5) is compared with V0 so as to determine whether or not V<V0. When the comparison result is "YES" (V<V0), the control advances to a step ST10. Alternately when the comparison result is "NO" (V≧V0), the control moves to a step ST09.

At the step ST09, slowdown control is achieved in which the control unit 24 (FIG. 5) controls the electric motors 13L, 13R via the motor drivers 29L, 29R so as to slow down the rotational speed of the driving wheels 15L, 15R. This operation continues until the vehicle speed V is below V0.

At the step ST10, the left and right brakes 17L, 17R (FIG. 5) are released or de-activated to allow rotation of the left and right driving wheels 15L, 15R. After the step ST10, the control goes on to a step ST11.

The step ST11 is achieved on condition that VKRV>Vm and V<V0 (that is, the right turn control lever 23R is in the turn control range defined between the full-brake position P3 and the stroke end position P2, and the vehicle is stopped or moving at a slow speed which allows the vehicle to make an abrupt turn). At the step ST11, the right electric motor 13R (FIG. 5) is rotated in the reverse direction and, at the same time, the left electric motor 13L is rotated in the forward direction. As a result of simultaneous driving of the left and right electric motors 13L, 13R in opposite directions, the vehicle starts to make an abrupt turn in the rightward direction while staying at the same position (spot turn).

When the vehicle has turned rightward through a desired angle (180 degrees, for example), the operator releases the right turn control lever 23R, allowing the lever 23R to return to its initial zero-brake position P1 (FIGS. 3 and 4B). This causes the output BKRV from the right brake potentiometer 27R to go down to or below Vm (BKRV≦Vm). This condition is detected at a step ST12 where-upon the control is terminated and operation of the vehicle returns to the regular operation mode.

The speed of the electric motors 13L, 13R achieved at the steps ST05 and ST11 may be either fixed at a predetermined value, or alternately variable. In the latter case, the motor speed is set to be proportional to the output ACCV from the accelerator potentiometer 26 (corresponding to the position of the accelerator lever 22). By thus setting the motor speed, the vehicle can make a spot turn at the same speed as a preceding working operation which the vehicle has done.

FIGS. 7A to 7C are illustrative of the manner in which the vehicle makes a spot turn in the rightward direction through an angle of 180 degrees. In these figures, the left turn control lever is not shown for the purpose of illustration. When the right turn control lever 23R is manipulated or otherwise pulled so as to approach the handgrip 25R across the full-brake position P2 (FIG. 3), the left electric motor 13L is driven to rotate in the forward direction and, at the same time, the right electric motor 13R is driven to rotate in the reverse direction. This means that the left crawler belt 16L is driven to run or travel in the forward direction, while the right crawler belt 16R is driven to run or travel in the backward direction. As a result of simultaneous running of the left and right crawler belts 16L, 16R in the forward and backward directions, respectively, the vehicle 10 starts to turn rightward about a center G1 common to the left and right crawler belts 16L, 16R, with a turning radius R1 equal to the distance from the turning center G1 to a front left corner of the load-carrying platform 20, as shown in FIG. 7A.

Continuing operation of the left and right motors 13L, 13R will place the vehicle 10 to a position shown in FIG. 7B where the vehicle 10 has turned about the center G1 in the rightward direction through an angle of 90 degrees. As the turning operation further continues, the vehicle 10 completes a 180° turn while staying at the same position, as shown in FIG. 7C. Then the operator releases the right turn control lever 23 to thereby terminate the spot turn operation. A spot turn in the leftward direction can be achieved in the same manner as described above by pulling the left turn control lever 23L until it assumes a position located within the turn control range defined between the full-brake position P3 and the stroke end position P2 shown in FIGS. 3 and 4B.

For comparative purposes, description will be made to a normal pivot turn operation of the vehicle 10 with reference to FIGS. 8A and 8B. When a right turn of the vehicle 10 is desired, the right turn control lever 23R is pulled to assume the full-brake position P3 (FIGS. 3 and 4B) or a position immediately before the full-brake position P3, whereupon by the effect of a maximum brake force applied from the right brake 17R to the right driving wheel 15R, the right crawler belt 16R is stopped. In this instance, since the left crawler belt 16L continues its running in the forward direction, the vehicle 10 starts to turn rightward about a turning center G2 located at a longitudinal center of the right crawler belt 16R, with a turning radius R2 equal to the distance from the turning center G2 to the front left corner of the platform 20, as shown in FIG. 8B.

As the turning operation further continues, the vehicle 10 completes a 180° turn about the turning center G2. A comparative review of FIGS. 7C and 8B indicates that a turning area in a circle drawn with the turning radius R1 achieved by the spot turn operation (FIG. 7C) is much smaller than that in a circle drawn with the turning radius R2 achieved by the normal pivot turn operation (FIG. 8B). This proves that the spot turn is optimum to minimize the turning area of the vehicle 10.

When the direction of travel of the vehicle 10 is to be adjusted, the left or the right turn control lever 23L, 23R is lightly pulled to create a speed difference between the left and right crawler belts 16L, 16R due to a brake force applied from the left or right brake 17L, 17R to the corresponding driving wheel 15L, 15R. Thus, the vehicle starts to make a gradual turn in a desired direction. When a rapid direction change is needed, the left or right turn control lever 23L, 23R is pulled to an increased extent. In this instance, when the turn control lever 23L, 23R is in the brake full-brake position P3, the normal pivot turn will be achieved in the same manner as described above with reference to FIGS. 8A and 8B. Alternatively, when the turn lever 23L, 23R is in the turn control region defined between the full-brake position P3 and the stroke end position P2, the spot turn will be achieved in the same manner as described above with reference to FIGS. 7A to 7C.

It will readily be understood that by merely manipulating the turn control levers 23L, 23R in an appropriate manner, the vehicle can make a gradual turn, a normal pivot turn or a spot turn. The turn control levers 23L, 23R double in function as brake control levers to achieve gradual turns and a normal pivot turn, and also as a spot-turn initiating levers to achieve a spot turn. This obviates the need for the provision of a separate lever used exclusively for achieving different sorts of turn. The motorized vehicle is relatively simple in construction and can easily be operated even by an un-skilled operator.

FIG. 9 shows a motorized vehicle 10a taking the form of a walk-behind motorized crawler cart according to a second embodiment of the present invention. The vehicle 10a is structurally and operationally the same as the vehicle 10 of the first embodiment shown in FIG. 1, with the exception that the left and right turn control levers 23L, 23R serve only as brake control levers, and left and right spot turn switches 35L, 35R are provided separately to achieve a spot turn. Due to this similarly, these parts which are identical to those shown in FIG. 1 are designated by the same reference characters and further description thereof can, therefore, be omitted to avoid duplicate description.

Figure 10A:
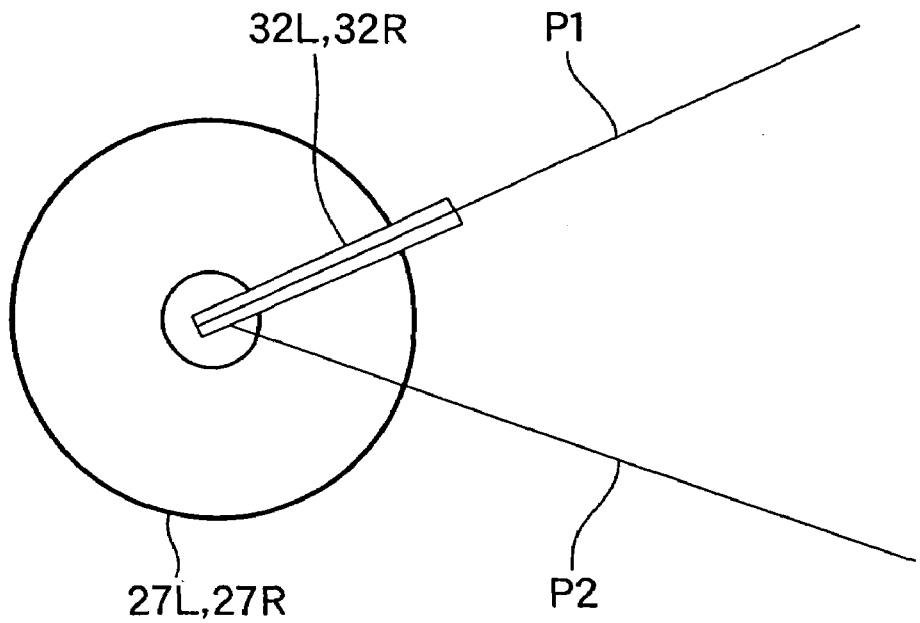
FIG. 10A is a diagrammatical view showing the operation of a brake potentiometer taken in conjunction with the position of a brake control lever.
Figure 11:
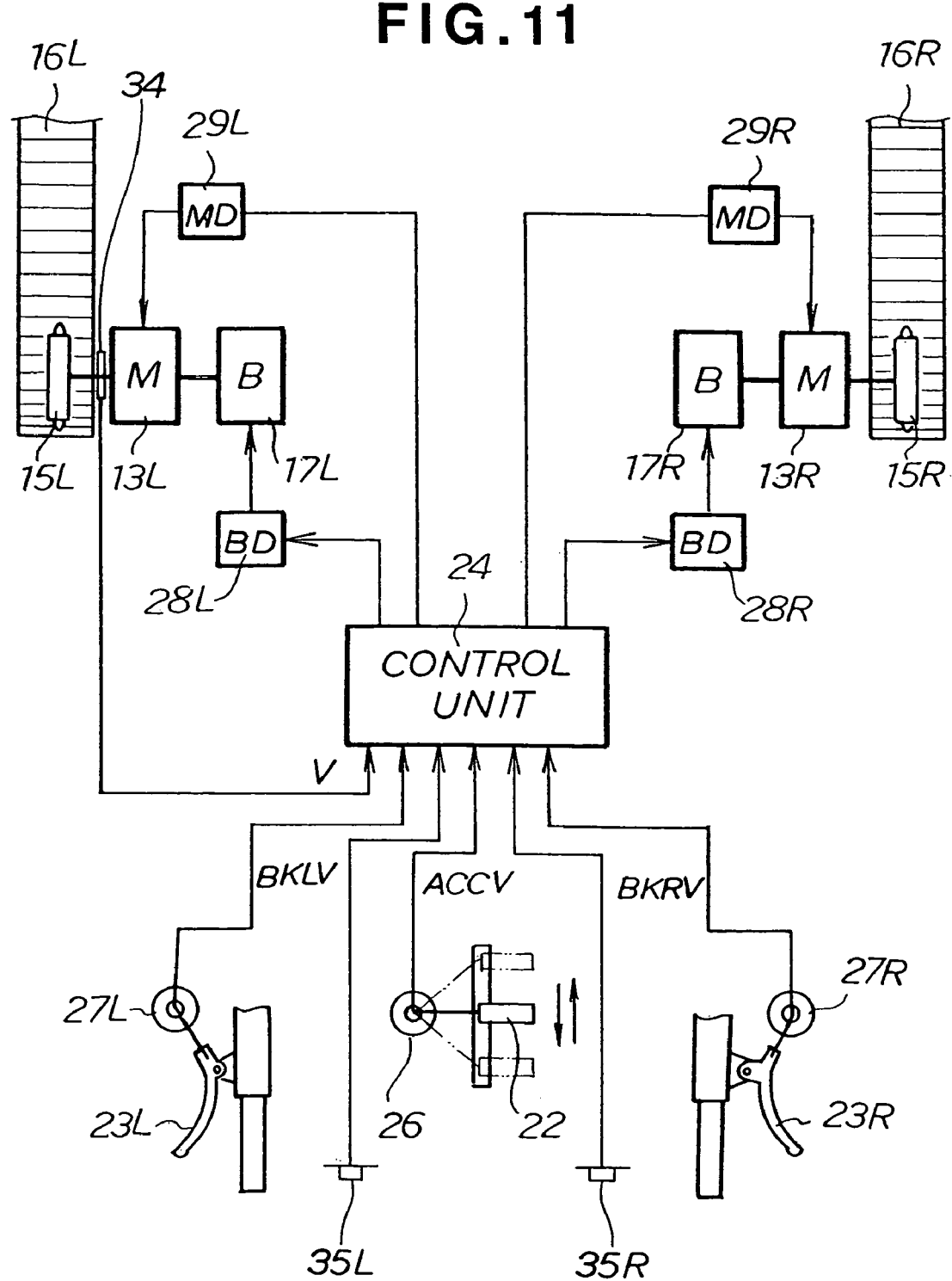
FIG. 11 is a pictorial block diagram showing a control system of the motorized vehicle shown in FIG. 9.

As shown in FIG. 9, the left and right spot turn switches 35L, 35R are provided on an operator control panel 21 and electrically connected to a control unit 24 disposed inside the operator control panel 21. The left and right turn control levers 23L, 23R (hereinafter referred to as brake control levers) are electrically connected to the control unit 24 via left and right brake potentiometers 27L, 27R (FIGS. 10A and 11). The potentiometers 27L, 29L each have an actuator arm 32L, 32R (FIG. 10A) directly connected to the corresponding brake control lever 23L, 23R.

Figure 10B:
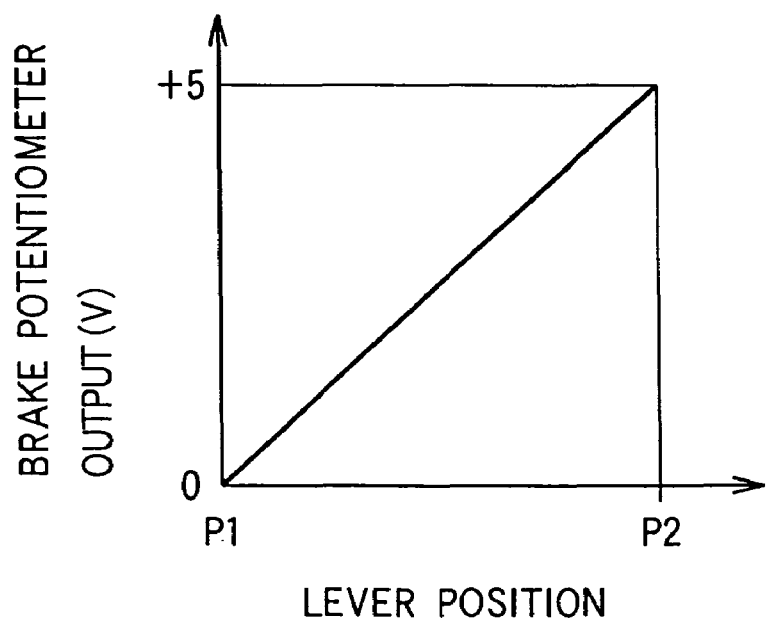
FIG. 10B is a graph showing the relationship between the output from the brake potentiometer and position of the brake control lever.

As understood from FIG. 10A, the brake control levers 23L, 23R (i.e., the actuator arms 32L, 32R of the brake potentiometers 27L, 27R) are angularly movable between an initial zero-brake position (first position) P1 and a full-brake position (second position) P2. The output from the brake potentiometer 27L, 27R varies linearly with the position of the actuator arm 32L, 32R (i.e., the position of the brake control lever 23L, 23R), as indicated by a graph shown in FIG. 10B. In the illustrated embodiment, the output from the brake potentiometer 27L, 27R is set to vary within a range from 0 to 5.0 volts (V). When the brake control lever 23L, 23R is in the initial zero-brake position P1, the output from the brake potentiometer is nil. When the turn control lever 23L, 23R is in the full-brake position P2, the output from the brake potentiometer is 5.0 V. In terms of the output, the full-brake position P2 in this position corresponds to the stroke end position P2 of the first embodiment shown in FIG. 4B.

FIG. 11 shows a control system of the motorized vehicle 10a. The control system structurally differs from the control system of the first embodiment shown in FIG. 5 in that the spot turn switches 35L, 35R are provided separately from the brake control levers (turn control levers) 23L, 23R. Due to this similarity, these parts which are identical to those shown in FIG. 5 are designated by the same reference characters, and no further description thereof is needed.

With the control system arranged as shown in FIG. 11, when the left brake control lever 23L is manipulated or otherwise pulled by the operator, the left brake potentiometer 27L generates an output signal BKLV corresponding in magnitude to the amount of angular displacement of the brake control lever 23L. Upon receipt of the output signal BKLV from the brake potentiometer 27L, the controller 24 sends a command signal to the left brake driver 28L so that the left brake 17L is driven to apply to the left electric motor 13L a brake force corresponding to the position of the left brake control lever 23L. By thus braking the electric motor 13L, the rotating speed of the left driving wheel 15L decreases linearly with the amount of displacement of the left brake control lever 23L. When the brake control lever 23L is pulled so as to assume the full-brake position P2 (FIG. 10A), a maximum brake force is applied from the left brake 17L to the left motor 13L, thereby stopping rotation of the left motor 13L. Thus, the left driving wheel 15L is stopped. Similarly, when the right brake control lever 23R is manipulated or otherwise pulled by the operator, the control unit 24 controls operation of the right brake 17R via the right brake driver 28R so that the right motor 13R is braked with a brake force variable linearly with the output BKRV from the right brake potentiometer 27R. When the right brake control lever 23R is in the full-brake position P2 (FIG. 10A), the output BKRV from the right brake potentiometer 27R has a maximum value. This makes the right motor 13R to stop rotation by the effect of a maximum brake force applied from the right brake 17R.

When the accelerator lever 22 is actuated or otherwise tilted by the operator, the accelerator potentiometer 26 generates an output signal ACCV corresponding in magnitude to the amount of angular displacement of the accelerator lever 22. Upon receipt of the output signal ACCV from the accelerator potentiometer 26, the controller 24 sends a command signal to the left and right motor drivers 29L, 29R so that the left and right electric motors 13L, 13R rotate the corresponding driving wheels 15L, 15R in the forward or backward direction at a speed corresponding to the position of the accelerator lever 22. Thus, the vehicle (crawler cart) with crawler belts 16L, 16R independently driven by the driving wheels 15L, 15R moves in the forward or backward direction at the desired speed.

Figure 12:
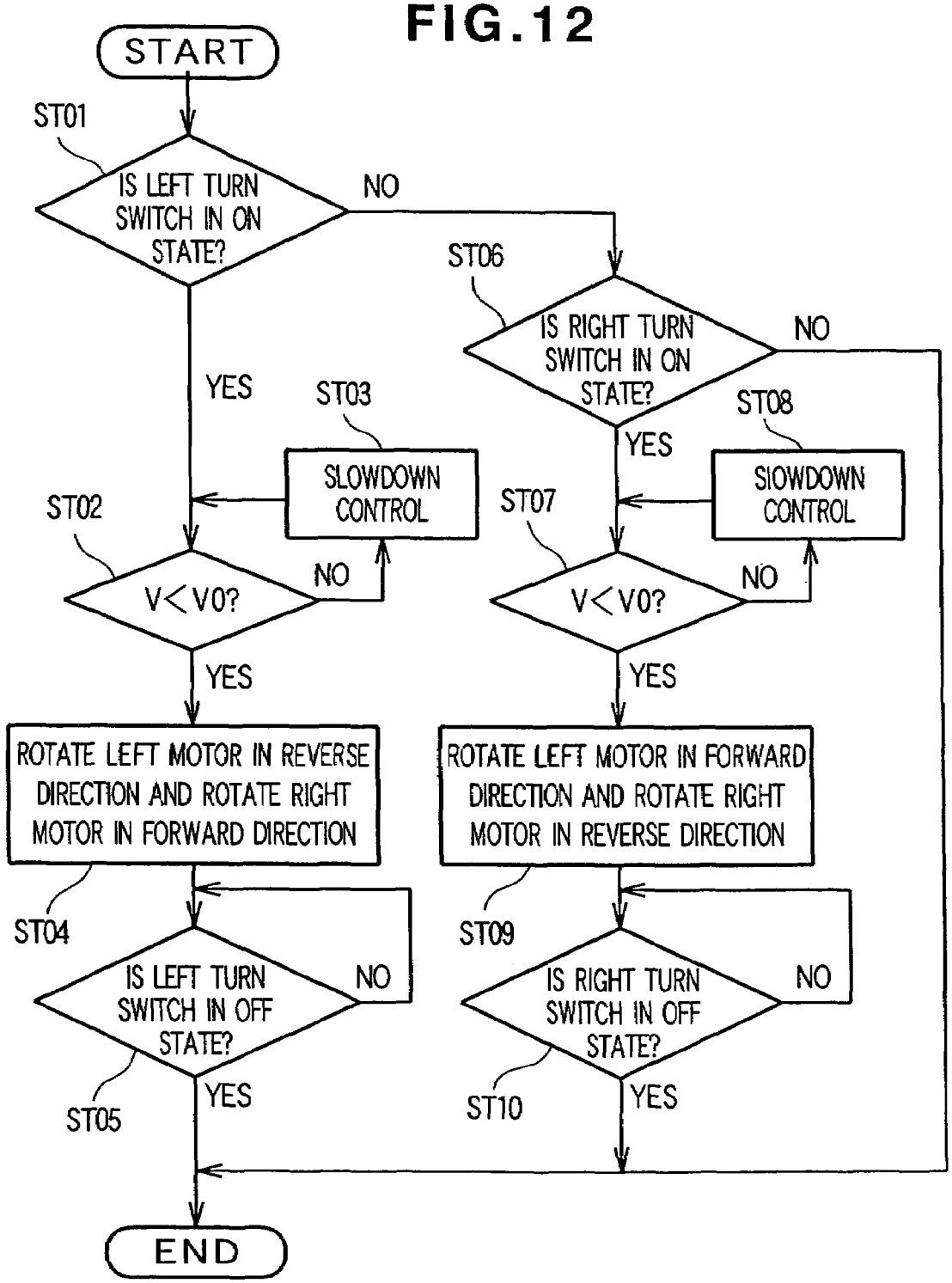
FIG. 12 is a flowchart showing a series of operations achieved by the control system when the vehicle of FIG. 9 makes a spot turn.

When the left or right spot turn switch 35L, 35R is activated, turn control operation is achieved under the control of the control unit 24 so as to ensure that the vehicle makes a turn while staying at the same direction (spot). The turn control operation will be described with reference to a flowchart shown in FIG. 12.

At a first step ST01, a judgment is made to determine as to whether or not the left spot turn switch 35L is in the "ON" state. When the result of judgment is "YES", the control then goes on to a step ST02. Alternately, when the judgment result is "NO", the control moves to a step ST06.

At the step ST02, the output signal V from the vehicle speed sensor 34 (FIG. 11) is monitored so as to determine whether or not the vehicle speed V is not more than V0 where V0 represents the vehicle being at halt or moving at a slow speed which allows the vehicle to make an abrupt turn. When the judgment result is "YES" (V<V0), the control advances to a step ST04. Alternately when the judgment result is "NO" (V≧V0), the control moves to a step ST03.

At the step ST03, slowdown control is achieved in which the control unit 24 (FIG. 11) controls the electric motors 13L, 13R via the motor drivers 29L, 29R so as to slow down the rotational speed of the driving wheels 15L, 15R. This operation continues until the vehicle speed V is below V0.

The step ST04 is achieved on condition that VKLV>Vm and V<V0 (that is, the left spot turn switch 35L is in the "ON" state, and the vehicle is stopped or moving at a slow speed which allows the vehicle to make an abrupt turn). At the step ST04, the left electric motor 13L (FIG. 11) is rotated in the reverse direction and, at the same time, the right electric motor 13R is rotated in the forward direction. By thus driving the left and right electric-motors 13L, 13R simultaneously in opposite directions, the vehicle starts to make an abrupt turn in the leftward direction while staying at the same position (spot turn).

When the vehicle has turned leftward through a desired angle (180 degrees, for example), the operator deactivates the left spot turn switch 35L, causing the output BKLV from the left brake potentiometer 27L to go down to or below Vm (BKLV≦Vm). This condition is detected at a step ST05, and upon detention of this condition, the control comes to an end and operation of the vehicle returns to a regular operation mode.

At the step ST06, which follows the "NO" state at the preceding step ST01, a judgment is made to determine as to whether or not the right spot turn switch 35R is in the "ON" state. When the result of judgment is "YES", the control advances to a step ST07. Alternately, when the judgment result is "NO", this means that either switch 35L, 35R is not activated. Accordingly, the control is terminated.

At the step ST07, following the "YES" state in the preceding step ST06, the output signal V from the vehicle speed sensor 34 (FIG. 11) is compared with V0 so as to determine whether or not V<V0. When the comparison result is "YES" (V<V0), the control advances to a step ST09. Alternately when the comparison result is "NO" (V≧V0), the control moves to a step ST08.

At the step ST08, slowdown control is achieved in which the control unit 24 (FIG. 11) controls the electric motors 13L, 13R via the motor drivers 29L, 29R so as to slow down the rotational speed of the driving wheels 15L, 15R. This operation continues until the vehicle speed V is below V0.

The step ST09 is achieved on condition that VKRV>Vm and V<V0 (that is, the right spot turn switch 35R is in the "ON" state, and the vehicle is stopped or moving at a slow speed which allows the vehicle to make an abrupt turn). At the step ST09, the right electric motor 13R (FIG. 11) is rotated in the reverse direction and, at the same time, the left electric motor 13L is rotated in the forward direction. As a result of simultaneous driving of the left and right electric motors 13L, 13R in opposite directions, the vehicle starts to make an abrupt turn in the rightward direction while staying at the same position (spot turn).

When the vehicle has turned rightward through a desired angle (180 degrees, for example), the operator deactivates the right spot turn switch 35R, causing the output BKRV from the right brake potentiometer 27R to go down to or below Vm (BKRV≦Vm). This condition is detected at a step ST010, and upon detention of this condition, the control is terminated operation of the vehicle returns to a regular operation mode.

The speed of the electric motors 13L, 13R achieved at the steps ST04 and ST09 may be either fixed at a predetermined value, or alternately variable. In the latter case, the motor speed is set to be proportional to the output ACCV from the accelerator potentiometer 26 (FIG. 11) By thus setting the motor speed, the vehicle can make a spot turn at the same speed as a preceding working operation which the vehicle has done.

FIGS. 13A to 13C are illustrative of the manner in which the vehicle 10a makes a spot turn in the rightward direction through an angle of 180 degrees. In these figures, the brake control levers are not shown for the purpose of illustration. When the right spot turn switch 35R is activated, the left electric motor 13L is driven to rotate in the forward direction and, at the same time, the right electric motor 13R is driven to rotate in the reverse direction. This means that the left crawler belt 16L is driven to run or travel in the forward direction, while the right crawler belt 16R is driven to run or travel in the backward direction. As a result of simultaneous running of the left and right crawler belts 16L, 16R in the forward and backward directions, respectively, the vehicle 10a starts to turn rightward about a center G common to the left and right crawler belts 16L, 16R, with a turning radius R equal to the distance from the turning center G to a front left corner of the load-carrying platform 20, as shown in FIG. 13A.

Continuing operation of the left and right motors 13L, 13R will place the vehicle 10a to a position shown in FIG. 13B where the vehicle 10 has turned about the turning center G in the rightward direction through an angle of 90 degrees. As the turning operation further continues, the vehicle 10a completes a 180° turn while staying at the same position, as shown in FIG. 13C. Then the operator deactivates the right spot turn switch 35R to thereby terminate the spot turn operation. A spot turn in the leftward direction can be achieved in the same manner as described above by activating the left spot turn switch 35L.

The spot turn switches 35L, 35R may be comprised of a push button switch, a self-hold push-push switch, a self-hold toggle switch, or a self-hold dial switch. Though not shown, these switches 35L, 35R may be mounted to the left and right handlebars 30L, 30R adjacent to the handgrips 25, 25R.

Figure 14:
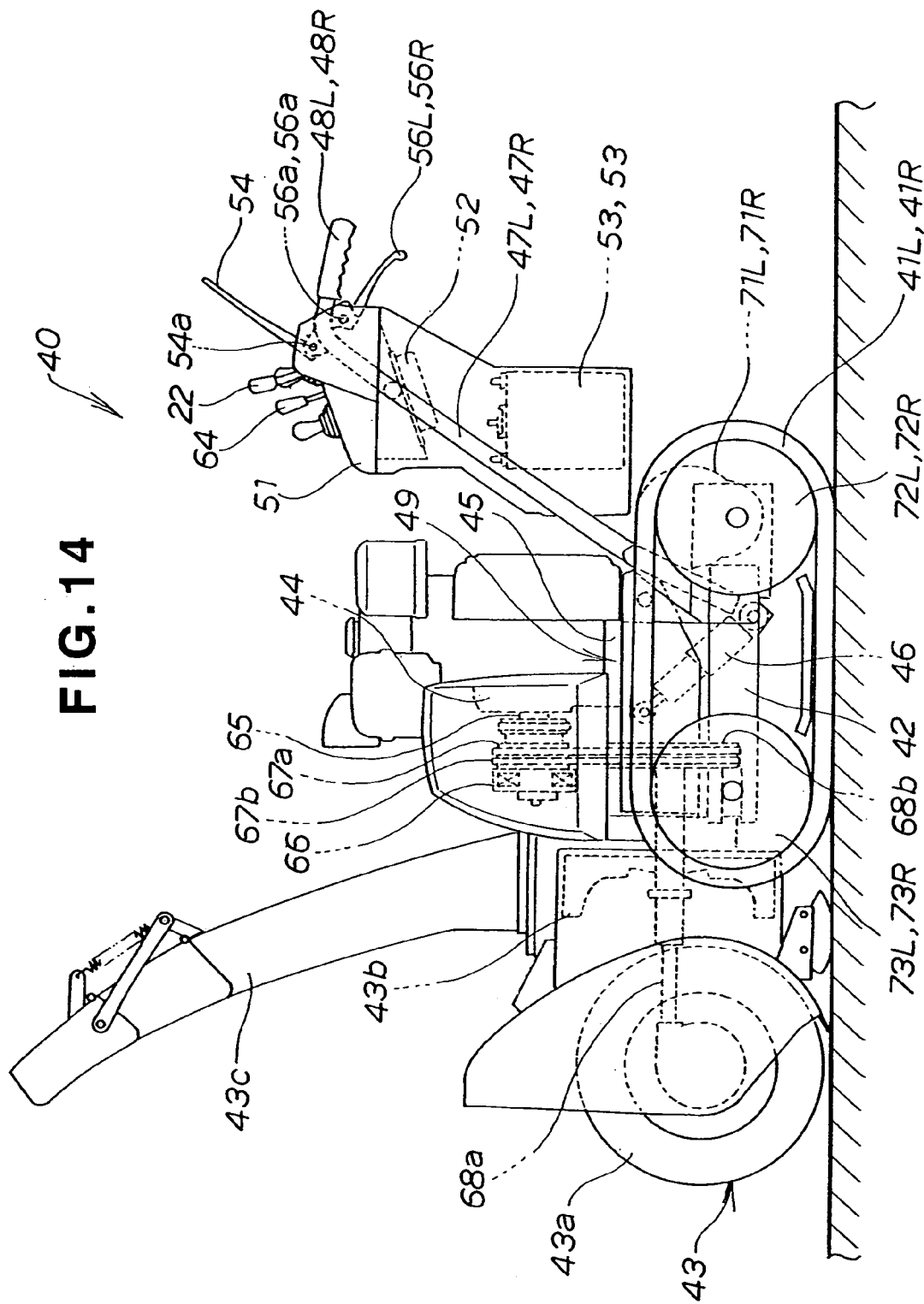
FIG. 14 is a side view of a snowplow embodying the present invention.
Figure 15:
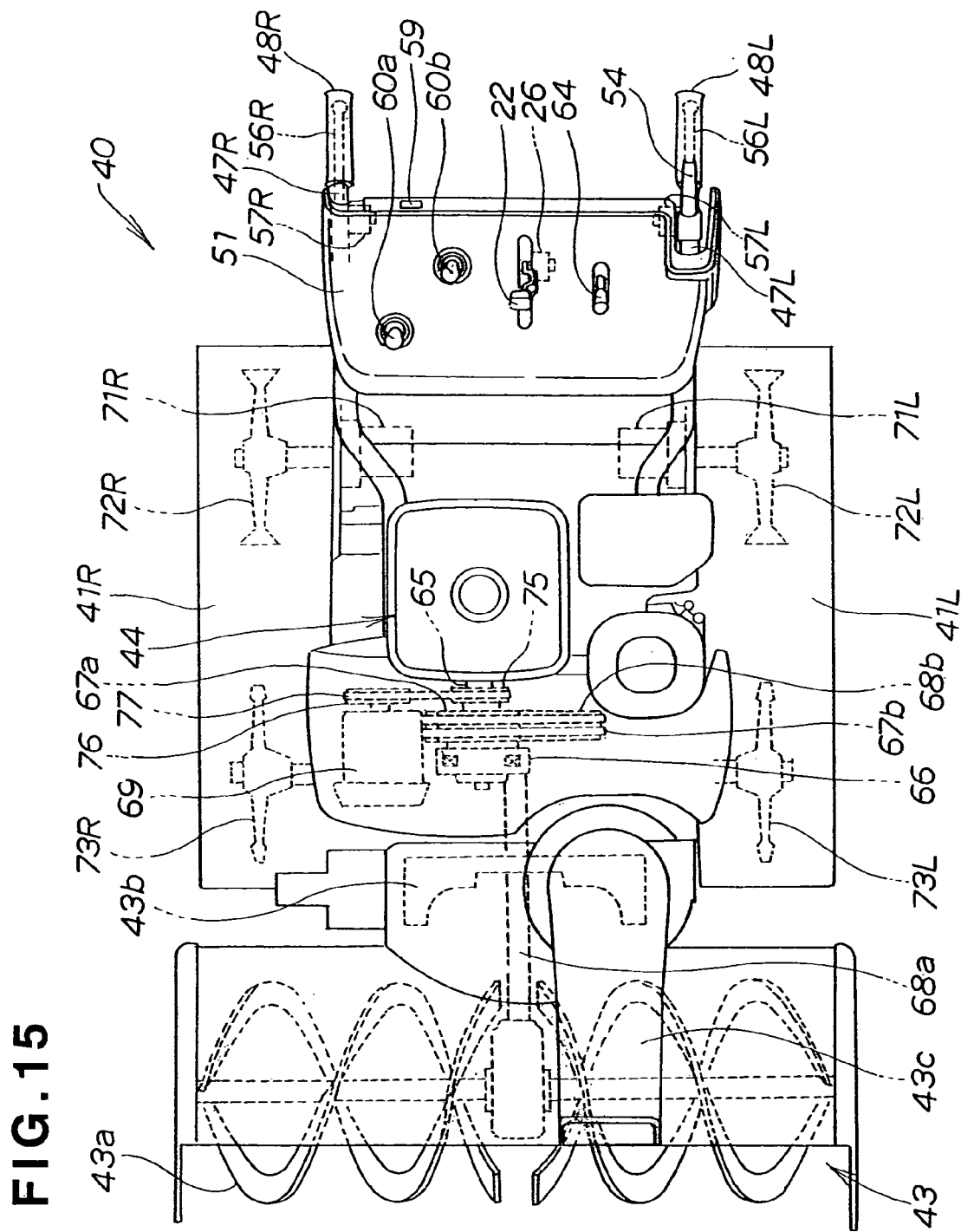
FIG. 15 is a plan view of the snowplow.

FIGS. 14 and 15 show a walk-behind self-propelled crawler snowplow 40 embodying the present invention. The snowplow 40 generally comprises a propelling frame 42 carrying thereon left and right crawler belts 41L, a vehicle frame 45 carrying thereon a snowplow mechanism 43 and an engine (prime motor) 44 for driving the snowplow mechanism 43, a frame lift mechanism 46 operable to lift a front end portion of the vehicle frame 45 up and down relative to the propelling frame 42, and a pair of left and right operation handlebars 47L and 47R extending from a rear portion of the propelling frame 42 obliquely upward in a rearward direction of the snowplow 40. The propelling frame 42 and the vehicle frame 45 jointly form a vehicle body 49.

The left and right crawler belts 41L, 41R are driven by left and right electric motors 71L, 71R, respectively. The crawler belts 41L, 41R are each trained around a driving wheel 72L, 72R and an idler wheel 73L, 73R. The driving wheel 72L, 72R is disposed on a rear side of the crawler belt 41L, 41R, and the idler wheel 73L, 73R is disposed on a front side of the crawler belt 41L, 41R.

The snowplow mechanism 43 has an auger 43a, a blower 43b and a discharge duct 43c that are mounted to a front portion of the vehicle frame 45. In operation, the auger 43a rotates to cut snow away from a road, for example, and feed the cut mass of snow to the blower 43b which blows out the snow through the discharge duct 43c to a position far distant from the snowplow 40.

The operation handlebars 47L, 47R are adapted to be gripped by a human operator (not shown) walking behind the snowplow 40 in order to maneuver the snowplow 40. An operator control panel 51, a control unit 52 and batteries 53 are arranged in a vertical space defined between the handlebars 47L, 47R and they are mounted to the handlebars 47L, 47R in the order named when viewed from the top to the bottom of FIG. 14.

The operation handlebars 47L, 47R each have a handgrip 48L, 48R at the distal end (free end) thereof. The left handlebar 47L has a parking brake lever 54 disposed in close proximity to the handgrip 48L. The parking brake lever 54 is of the deadman lever type and is adapted to be gripped by the operator together with the left handgrip 48L. When gripped, the parking brake lever 54 turns about a pivot pin 54a in a direction toward the handgrip 48L. With this movement of the parking brake lever 54, a brake switch 55 (FIG. 16) is turned on, thereby releasing a brake on the driving wheels 72L, 72R. The left and right handlebars 14L, 47R further have turn control levers 56L, 56R associated with the respective handgrips 48L, 48R.

The crawler snowplow 40 of the foregoing construction is self-propelled by the crawler belts 41L, 41R driven by the electric motors 71L, 71R and is also maneuvered by the human operator walking behind the snowplow 40 while gripping the handlebars 47L, 47R.

In the crawler snowplow 40, a generator driving pulley 75 is attached to an output shaft 65 of the engine 44. The diving pulley 75 is connected by an endless belt 77 to a generator driven pulley 76 mounted to the shaft of a generator 69. Thus, rotation of the engine output shaft 65 is transmitted via the belt 77 to the generator 69. That is, when the engine 44 is running, the generator 69 is driven via the belt drive 75–77 so that the batteries 53 (FIG. 14) are charged with electric current supplied from the generator 69.

A second driving pulley 67a is coupled via an electromagnetic clutch 66 to the output shaft 65 of the engine 44, and a second driven pulley 68b is connected to one end of a rotating shaft 68a. The second driving and driven pulleys 67a, 68b are connected by a second endless belt 67b. The rotating shaft 68a is connected to a central shaft of the auger 43a via a worm gear speed reducing mechanism (not designated). The rotating shaft 68a is also connected to the blower 43b. While the engine 44 is running, the auger 43a and blower 43b are drivable through the second belt drive 67a, 67b, 68b when the electromagnetic clutch 66 is in the engaged state.

The operator control panel 51 has a lift control lever 60a for controlling operation of the frame lift mechanism 46 (FIG. 14), a duct control lever 60b for changing direction of the discharge duct 43c, an accelerator lever 22 for controlling the direction and speed of travel of the snowplow 40, and a throttle lever 64 for controlling the speed of the engine 44. The operator control panel 51 further has a clutch switch 59 disposed adjacent to the right operation handlebar 47R. The clutch switch 59 is a normally open contact switch and adapted to be turned on and off to achieve on-off control of the electromagnetic clutch 66.

Figure 16:
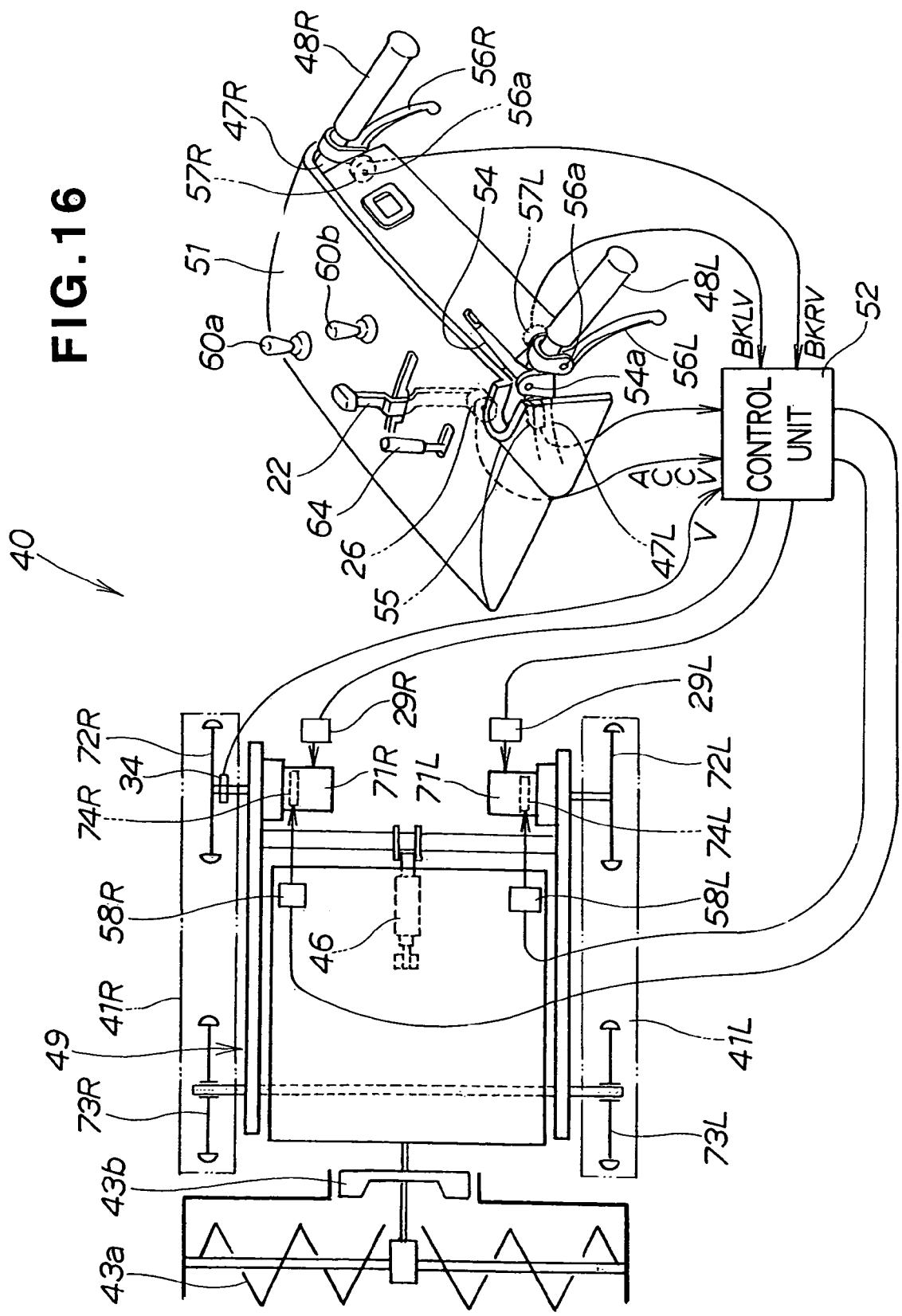
FIG. 16 is a diagrammatical, partly perspective view showing a control system of the snowplow.

As shown in FIG. 16, the left and right turn control levers 56L, 56R each have an integral pivot pin 56a by means of which the lever 56L, 56R is pivotally mounted to the corresponding handlebar 47L, 47R. The pivot pin 56a serves also as a rotating shaft of a rotary type brake potentiometer 57L, 57R which is associated with the turn control lever 56L, 56R to monitor the position of the turn control lever 56L, 56R. The brake potentiometer 57L, 57R are electrically connected to the control unit 52. Left and right brakes 74L, 74R are associated with the left and right motors 71L, 71R, respectively, for independently applying a brake force to the corresponding motors 71L, 71R. The Left and right brakes 74L, 74R are driven by left and right brake drivers 58L, 58R under the control of the control unit 52 based on the amount of angular displacement of the turn control levers 56L, 56R detected by the brake potentiometers 57L, 57R. The accelerator lever 22 is electrically connected to the control unit 52 via an accelerator potentiometer 26. The left and right motors 71L, 71R are driven by left and right motor drivers 29L, 29R under the control of the control unit 52 based on the amount of angular displacement of the accelerator lever 22 detected by the accelerator potentiometer 26. The operation of the accelerator lever 22 and turn control levers 56L, 56R are identical to the operation of those 22, 23L, 23R described above with reference to the first embodiment shown in FIGS. 1–8, and further description thereof can be omitted.

It will be appreciated from the foregoing description that by virtue of the left and right turn control levers mounted to the left and right handlebars so as to extend along the left and right handgrips, the operator can manipulate the turn control levers while keeping a grip on the handgrips. This enables the operator to steer the motorized vehicle stably and reliably in a desired direction. Furthermore, the turn control levers can be easily manipulated with operator's fingers of the operator. This will lessen the load on the operator.

The present disclosure relates to the subject matter of Japanese Patent Applications Nos. 2000-331554, 2000-331561 and 2001-134689, filed Oct. 30, 2000, Oct. 30, 2000 and May 1, 2001, respectively, the disclosures of which are expressly incorporated herein by reference in their entirety.

What is claimed is:

1. A motorized vehicle comprising:
a vehicle body having a front end and a rear end;
a left driving wheel and a right driving wheel mounted on the vehicle body for undergoing rotation to cause the motorized vehicle to undergo travelling;
a left electric motor and a right electric motor mounted on the vehicle body for independently rotating the left and right driving wheels, respectively, at variable speeds; and a plurality of actuators for effecting simultaneously driving of the left and right electric motors in opposite directions to turn the motorized vehicle while the motorized vehicle does not undergo travelling, the actuators comprising a left spot turn switch connected to the left and right electric motors and manually operable to cause the left electric motor to rotate in a reverse direction and the right electric motor to rotate in a forward direction, and a right spot turn switch connected to the left and right electric motors and manually operable to cause the right electric motor to rotate in the reverse direction and the left electric motor to rotate in the forward direction.

2. A motorized vehicle according to claim 1; further comprising an operator control panel mounted to the vehicle body and containing the left and right spot turn switches.

3. A motorized vehicle according to claim 1; further comprising a pair of left and right crawler belts driven by the left and right driving wheels, respectively.

4. A motorized vehicle comprising:
a vehicle body;
at least a pair of wheels mounted on the vehicle body for undergoing rotation to cause the motorized vehicle to undergo travelling;
a pair of electric motors each mounted on the vehicle body to selectively undergo forward and reverse rotation to rotationally drive a respective one of the wheels;
a first switch connected to the electric motors and operative when activated to cause the electric motors to undergo rotation simultaneously in opposite directions to turn the motorized vehicle in a first direction while the motorized vehicle does not undergo travelling; and
a second switch connected to the electric motors and operative when activated to cause the electric motors to undergo rotation simultaneously in the opposite directions to turn the motorized vehicle in a second direction opposite to the first direction while the motorized vehicle does not undergo travelling.

5. A motorized vehicle according to claim 4; wherein the pair of electric motors comprises a first electric motor and a second electric motor; and wherein operation of the first switch causes the first electric motor to undergo reverse rotation and the second electric motor to undergo forward rotation, and operation of the second switch causes the second electric motor to undergo reverse rotation and the first electric motor to undergo forward rotation.

6. A motorized vehicle according to claim 4; further comprising a pair of crawler belts each entrained around a respective one of the wheels.

7. A motorized vehicle according to claim 4; further comprising an operator control panel mounted to the vehicle body and containing the first and second switches.

* * * * *